Sept. 24, 1957         A. E. JENSEN         2,807,736
STARTER FIELD WINDING
Filed Dec. 19, 1955

A. E. JENSEN
INVENTOR.

BY

ATTORNEYS

United States Patent Office 2,807,736
Patented Sept. 24, 1957

2,807,736

STARTER FIELD WINDING

Arvid E. Jensen, Ypsilanti, Mich., assignor to Ford Motor Company, Dearborn, Mich., a corporation of Delaware Application December 19, 1955, Serial No. 553,950

9 Claims. (Cl. 310—184)

This invention relates to the electrical arts and more specifically to windings suitable for a series compound dynamo electric machine.

This invention has been specifically perfected to enable an internal combustion engine starting motor to be built having a performance equal to or better than that of previous similar machines and demonstrating an overall economy in the use of copper or their conductive material in the neighborhood of fifteen percent.

Figure 1:
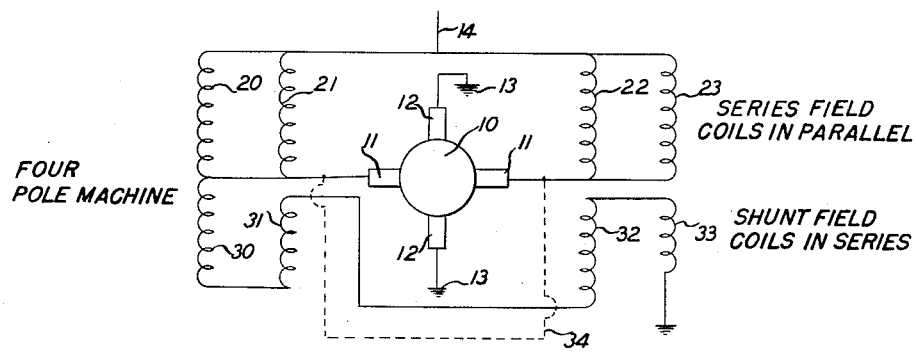
Figure 2:
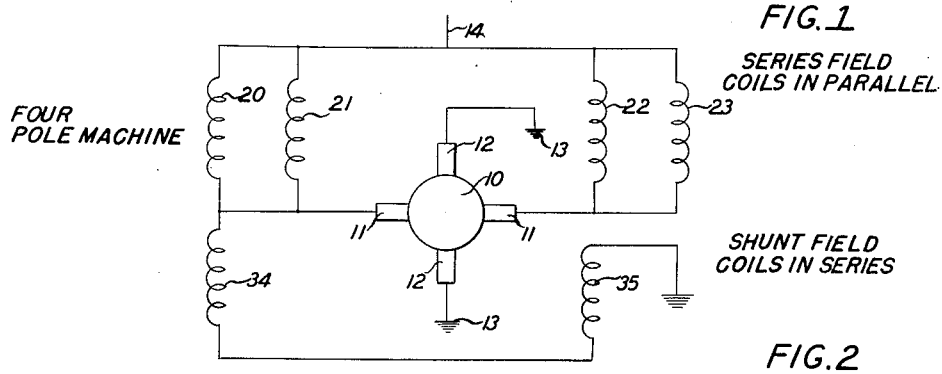
Figure 3:
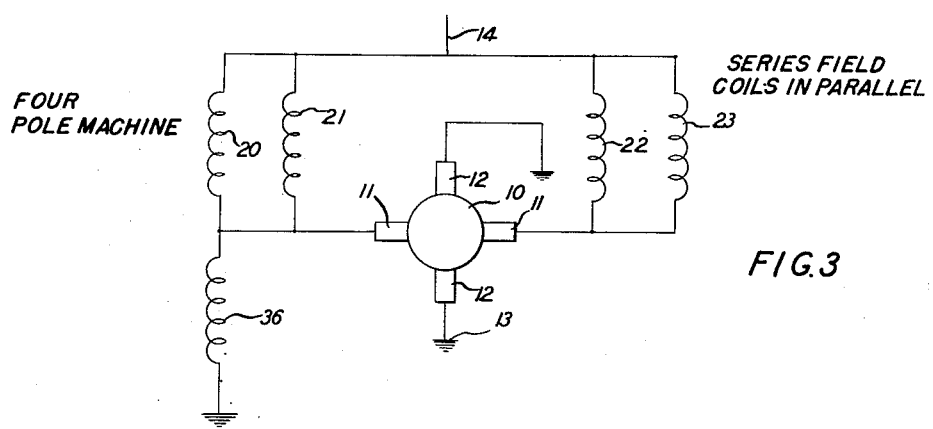

For a detailed understanding of this invention, attention is invited to the attached drawings in which:

Figure 1 represents a schematic wiring diagram of a starter motor constructed according to one embodiment of this invention, and Figure 2 is a similar motor constructed according to another embodiment of the invention, and Figure 3 is a similar motor constructed according to still another embodiment of the invention.

The motor schematically represented in Figure 1 comprises an armature 10 energized by positive brushes 11 and negative brushes 12. The armature may be any conventional armature and forms no part of this invention. In the usual current automotive construction, negative brushes 12 are grounded as shown at 13. This starting motor is provided with four series coils denominated 20, 21, 22 and 23 and four shunt coils denominated 30, 31, 32 and 33. The use of shunt coils are necessary to reduce the undesirably high no-load speed which is inherent in an unmodified series motor.

This motor is energized by conductor 14. At present the usual practice is to make conductor 14 positive and ground 13 negative. Using this polarity the plus sides of series coils 20, 21, 22 and 23 are all connected directly to positive conductor 14. In the preferred form of the invention the negative ends of series coils 20, 21, 22 and 23 are connected to positive brushes 11 with two of the series coils being connected directly to each of the positive brushes 11. In contradistinction, shunt coils 30, 31, 32 and 33 are all connected in series with the positive end of shunt coil 30 being connected to one of positive brushes 11 and the negative end of shunt coil 33 being connected solidly to ground.

In actual practice each of the four series coils comprise nine turns of number 14 copper wire and are wound from one continuous conductor. Similarly the four shunt coils each comprise seventeen turns of number 21 copper wire. If desired, a jumper 34 may be employed to connect together the two positive brushes 11. In the construction of the field coils the heavy series windings are first placed and then the lighter shunt windings are superimposed upon the series coils. The connection of the shunt coil 30 to the negative end of the series coils rather than to conductor 14 permits these coils to operate at a lower voltage and hence conserves copper or other conductive windings.

Figure 2 shows an alternate form of the invention in which alternate poles are wound with the shunt windings. These shunt windings have been denominated 34 and 35. In such case the unwound poles are magnetized by induction only insofar as the shunt coils are concerned.

Figure 3 shows still another form of the invention in which only a single field pole is wound with a shunt coil 36. The pole opposite that one which supports coil 36 will be magnetized by induction only. These structures are to be employed where only a moderate degree of control must be exercised over the runaway speed.

The above description has been specifically directed to a four pole machine. While most commercial starting motors are so constructed, the invention is by no means so limited and can be applied equally well to any desired number of pole pieces. Similarly the number of brushes can be adjusted to suit any particular circumstances or requirements.

I claim as my invention:

1. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said series coils being connected in parallel with each other and conducting current in parallel from one terminal of the motor to the first pair of said pairs of brushes, each of said four poles being further wound with a separate shunt coil of a conductor lighter than the series coils, said shunt coils being connected in series and conducting current from the first pair of said pairs of brushes to the other terminal of said motor, the second pair of said pairs of brushes being connected to the other terminal of said motor.

2. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said four series coils being connected in parallel with each other and conducting current in parallel from one terminal of the motor to the first pair of said pairs of brushes, each of said four poles being further wound with a separate shunt coil of a conductor having a cross sectional area substantially one-quarter that of the series coils, said shunt coils being connected in series and conducting current from the first pair of said pairs of brushes to the other terminal of said motor, the second pair of said pairs of brushes, being connected to the other terminal of said motor.

3. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said four series coils being connected in parallel with each other, two of said series coils conducting current in parallel from one terminal of the motor to a single brush of the first one of said pairs of brushes, the other two series coils conducting current in parallel from said terminal to the other brush of the first one of said pairs of brushes, each of said four poles being further wound with a separate shunt coil of a conductor lighter than the series coils, said shunt coils being connected in series and conducting current from at least one of the brushes of said first pair of brushes, the second pair of said pairs of brushes being connected to the other terminal of the motor.

4. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said four series coils being connected in parallel with each other, two of said series coils conducting current in parallel from said terminal to the one brush of the first pair of said pairs of brushes, the other two series coils conducting current in parallel from said terminal of the other brush of the first pair of said pairs of brushes, each of said four poles being further wound with a separate shunt coil of a conductor lighter than the series coils, said shunt coils being connected in series and conducting current from at least one of the brushes of said first pair of brushes, the second of said pairs of brushes being connected to the other terminal of the motor, the electrical cross section of the series coil conductors bearing a ratio to the cross section of the shunt coil conductors approximately the same as the cross section of number 14 wire bears to number 21 wire.

5. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said series coils being connected in parallel with each other and conducting current in parallel from one terminal of the motor to the first pair of said pairs of brushes, each of said four poles being further wound with a separate shunt coil of a conductor lighter than the series coils, said shunt coils being connected in series and conducting current from the first pair of said pairs of brushes to the other terminal of said motor, the second of said pairs of brushes being connected to other terminal of said motor, said series coils being wound immediately adjacent the pole pieces and the shunt coils superimposed thereon.

6. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said four series coils being connected in parallel with each other, two of said series coils conducting current in parallel from one terminal to the one brush of the first pair of said pairs of brushes, the other two series coils conducting current in parallel from said terminal to the other brush of the first pair of said pairs of brushes, each of said four poles being further wound with a separate shunt coil of a conductor lighter than the series coils, said shunt coils being connected in series and conducting current from at least one of the brushes of said first pair of brushes, the second of said pairs of brushes being connected to the other terminal of the motor, the electrical cross section of the series coil bearing a ratio to the electrical cross section of the shunt coils approximately the same as the cross section of number 14 wire bears to number 21 wire, said series coils being wound immediately adjacent the pole pieces and the shunt coils being superimposed thereon.

7. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said series coils being connected in parallel with each other and conducting current in parallel from one terminal of the motor to the first pair of said pairs of brushes, at least one of said four poles being further wound with a separate shunt coil of a conductor lighter than the series coils, said shunt coil being connected between the first pair of said pairs of brushes and the other terminal of said motor, the second pair of said pairs of brushes being connected to the other terminal of the motor.

8. An internal combustion engine starting motor comprising a frame, four field poles mounted on the frame and an armature rotatably mounted in said frame, said armature including a commutator upon which is supported two pairs of brushes arranged at right angles to each other, each of said four poles being wound with a separate series coil of heavy wire, said series coils being connected in parallel with each other and conducting current in parallel from one terminal of the motor to the first pair of said pairs of brushes, at least two of said four poles being further wound with a separate shunt coil of a conductor lighter than the series coils, said shunt coils being connected in series and conducting current from the first pair of said pairs of brushes to the other terminal of said motor, the second pair of said pairs of brushes being connected to the other terminal of said motor.

9. An internal combustion engine starting motor comprising a frame, a plurality of field poles mounted on the frame and an armature rotatably mounted in said frame, said armature including a commutator upon which are supported brushes, at least two series coils connected in parallel with each other and connecting the armature to one terminal of the motor, at least two shunt coils arranged on said pole pieces and connected in series with each other and connecting the armature with the other terminal of the motor and shunting the armature.

References Cited in the file of this patent

UNITED STATES PATENTS

| | | |
|---|---|---|
| 608,309 | Steinmetz | Aug. 2, 1898 |
| 1,255,400 | Ferris | Feb. 5, 1918 |
| 1,325,677 | Midgley | Dec. 23, 1919 |
| 1,468,056 | Turbayne | Sept. 18, 1923 |
| 1,501,519 | Chryst | July 15, 1924 |
| 2,059,624 | Collins | Nov. 3, 1936 |